March 8, 1938.     W. V. FISHER     2,110,360
MEANS FOR FORMING GLASS MOLDS
Filed Aug. 17, 1935

Inventor
WILLIAM V. FISHER
By Finckel & Finckel
his Attorneys

Patented Mar. 8, 1938

2,110,360

UNITED STATES PATENT OFFICE 2,110,360

MEANS FOR FORMING GLASS MOLDS

William V. Fisher, Lancaster, Ohio, assignor to Anchor Hocking Glass Corporation, Lancaster, Ohio, a corporation of Delaware Application August 17, 1935, Serial No. 36,706

2 Claims. (Cl. 22—177)

This invention relates more particularly to the construction and process of making molds for the production of hollow glass ware, such as tumblers and similar vessels.

Such molds are commonly made of cast iron in one or more parts. In the production of hollow glass ware it is highly important that the matrix or molding surface be very hard and susceptible of being highly polished in order to avoid blemishes in the ware and loss thereof, the cost of removing such blemishes being prohibitive.

The object of the present invention is the provision of an improved means and method whereby the molding surfaces of the mold body or parts thereof are deeply chilled, hardened or tempered so that they will take a high polish and provide a durable surface adapted for the production of large quantities of uniformly satisfactory ware. Other objects will appear from the disclosure herein.

The invention is embodied in the example herein shown and method of operation set forth, the features of novelty being finally claimed.

In the accompanying drawing:—

Figure 1:
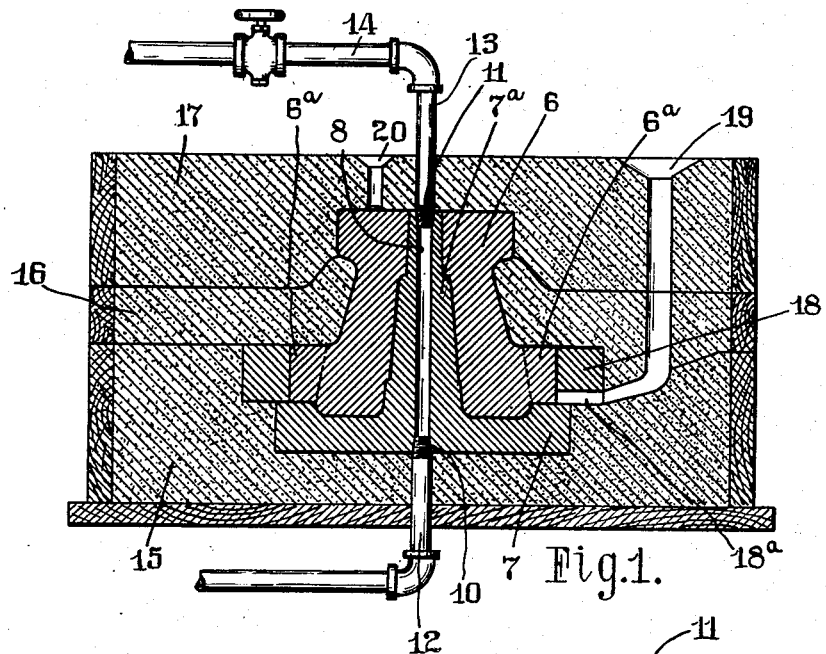
Figure 1 is a vertical sectional view showing the means for casting and chilling the glass mold.
Figure 3:
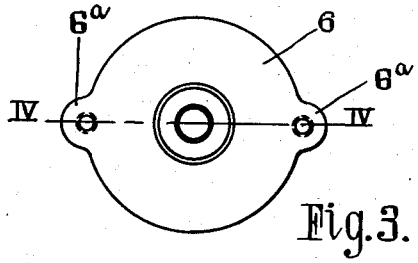
Fig. 3 is a top plan view of the glass mold.
Figure 2:
Fig. 2 is a vertical section of the principal chilling device.
Figure 4:
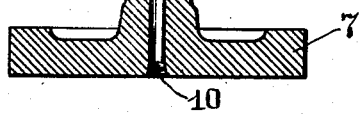
Fig. 4 is a vertical section of the glass mold on the line IV—IV Fig. 3.
Figure 5:
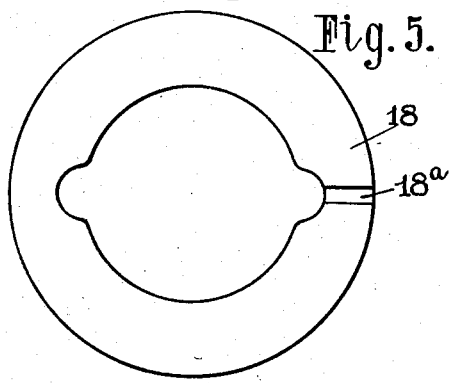
Fig. 5 is a plan view of the lower side of the chilling ring.

In the views 6 designates a glass mold to be produced, said glass mold being commonly of cast iron containing alloyed therewith such other metal or metals as may be desirable and useful in obtaining suitable hardness and texture. Said mold is provided with lugs 6a threaded for attachment to its support in a machine. The larger portion of the opening in the mold is shown as tapered internally to the external form of the tumbler to be made and the opening at the smaller end of the taper is to receive a valve-like member (not shown) for forming the bottom of the tumbler and dislodging the molded tumbler.

Preparatory to casting the glass mold there is constructed a shaping and chilling device of metal consisting of a laterally extended base portion 7 to form the upper end of the glass mold and having a central plug or projection 7a integral with the base portion to form the interior wall or glass-forming surface. In addition thereto a chilling ring 18 is formed of metal to rest on the upper margin of the laterally extended base portion 7 during the casting operation and having a chilling effect on said casting. Said chilling ring 8 is designed to cooperate with the base 7 in forming the external portion of the top of the glass mold including its lugs 6a and cooperates with said base in the chilling effect.

The base 7 and plug 7a are provided with a hole 8 axially in the plug, as shown in Fig. 1, said hole being threaded at its lower and upper ends, as shown at 10 and 11 respectively. The lower thread 10 receives a threaded nipple 12 suitably connecting it with a suitably controlled source of water or other cooling fluid. The upper thread 11 has connected with it a threaded nipple 13 suitably connected with a pipe 14 to carry away the waste liquid. Said pipe 14 contains a valve for controlling or varying the flow of the liquid passing through the chilling device. The water employed is of room temperature.

In practice a flask is provided for casting the glass-mold substantially as depicted in Fig. 1, with the drag 15, cheek 16 and cope 17, it being understood, of course, that the sand is tamped in the drag around the base 7 and ring 18, and the cheek and cope applied. At 19 is the pouring gate and 20 the strain gate. The pouring gate leads downward and through a groove 18a in the chilling ring 18 to the cavity formed for the reception of the molten iron.

The metal to form the mold body is preferably poured while white hot, and while the metal is being poured water is caused to flow through the hole 8 at a regular or desired speed for ten or twelve minutes or for such other period as to chill the cast metal to the desired depth, say one fourth of an inch or more of the glass mold body and provide a deeply extended hard surface capable of receiving a high polish.

In the chilling operation the ring 18 cooperates with the plug 7a and base 7 in conducting heat from the larger or heavier end of the casting and thereby promoting evenness of the chill throughout the inner or molding face of the glass mold. It also may be noted that at the region of said portion of the mold the entering water is cool and becomes warmer as it passes upward through the orifice 8, all of which tends to promote uniform tempering of the molding surface of the glass mold because the cooling effect of the water is greater where the heat is greater.

The forms of the parts can be changed without departing from the gist of the invention as claimed.

What I claim is:

1. In means for tempering the interior molding surface of a cast metal glass mold, said chilling means consisting of a tapered metallic body around which the glass molding surface of the glass mold is cast, said tapered body having integral therewith a laterally extended base forming a pattern surface for the upper rim of the glass mold cast, said tapered chilling means provided with an axial perforation therethrough and means for conducting under pressure and controlling the flow of a cooling liquid through said tapered chilling means from its larger end to and through its smaller end.

2. In means for tempering the interior glass molding surface of a cast metal glass mold, said chilling means consisting of a tapered metallic member around which the said glass mold is cast, said tapered member having integral therewith a laterally extended base forming a pattern surface for the upper rim of the mold cast, said tapered member provided with an axial perforation therethrough and means for conducting under pressure and controlling the flow of a cooling liquid through said tapered member from its larger end to and through its smaller end, and a removable chilling ring forming a portion of the molding surface cooperating with said chilling liquid to temper the larger end of said glass mold.

WILLIAM V. FISHER.